(12) United States Patent
Honeyman et al.

(10) Patent No.: US 7,012,735 B2
(45) Date of Patent: Mar. 14, 2006

(54) ELECTRO-OPTIC ASSEMBLIES, AND MATERIALS FOR USE THEREIN

(75) Inventors: Charles H. Honeyman, Roslindale, MA (US); Eva Chen, Cambridge, MA (US); Eric Howard Klingenberg, Emmaus, PA (US); Shafiq N. Fazel, Allentown, PA (US)

(73) Assignee: E Ink Corporaiton, Cambridge, MA (US)

( * ) Notice: Subject to any disclaimer, the term of this patent is extended or adjusted under 35 U.S.C. 154(b) by 76 days.

(21) Appl. No.: 10/810,761

(22) Filed: Mar. 26, 2004

(65) Prior Publication Data
US 2005/0007653 A1    Jan. 13, 2005

Related U.S. Application Data

(60) Provisional application No. 60/320,059, filed on Mar. 27, 2003.

(51) Int. Cl.
G02B 26/00 (2006.01)
G02B 1/03 (2006.01)

(52) U.S. Cl. ............... 359/296; 359/242; 359/245
(58) Field of Classification Search ............ 359/296, 359/238, 242, 245, 248, 265, 266, 267, 275, 359/297
See application file for complete search history.

(56) References Cited

U.S. PATENT DOCUMENTS

| | | | |
|---|---|---|---|
| 3,540,008 A * | 11/1970 | Lees et al. | 365/111 |
| 3,668,106 A | 6/1972 | Ota | 359/296 |
| 3,756,693 A | 9/1973 | Ota | 359/296 |
| 3,767,392 A | 10/1973 | Ota | 359/296 |
| 3,792,308 A | 2/1974 | Ota | 264/1.36 |
| 3,870,517 A | 3/1975 | Ota et al. | 427/213.3 |
| 3,892,568 A | 7/1975 | Ota | 204/606 |
| 4,418,346 A | 11/1983 | Batchelder | 359/296 |
| 4,448,493 A | 5/1984 | Matsudaira et al. | 252/514 |
| 4,550,982 A | 11/1985 | Hirai | 345/107 |
| 5,130,842 A * | 7/1992 | Gauthier et al. | 359/265 |
| 5,745,094 A | 4/1998 | Gordon, II et al. | 359/296 |
| 5,760,761 A | 6/1998 | Sheridan | 359/291 |
| 5,777,782 A | 7/1998 | Sheridan | 359/296 |
| 5,784,190 A | 7/1998 | Worley | 359/291 |
| 5,808,783 A | 9/1998 | Crowley | 359/296 |
| 5,872,552 A | 2/1999 | Gordon, II et al. | 345/107 |
| 5,891,366 A | 4/1999 | Gruenwald et al. | 252/514 |

(Continued)

FOREIGN PATENT DOCUMENTS

EP    1 145 072 B1    5/2003

(Continued)

OTHER PUBLICATIONS

Amundson, K., et al., "Flexible, Active-Matrix Display Constructed Using a Microencapsulated Electrophoretic Material and an Organic-Semiconductor-Based Backplane", SID 01 Digest, 160 (Jun. 2001).

(Continued)

*Primary Examiner*—Timothy Thompson
(74) *Attorney, Agent, or Firm*—David J. Cole (57) ABSTRACT

An electro-optic display comprises first and second substrates, and an adhesive layer and a layer of electro-optic material disposed between these substrates, the adhesive layer comprising a mixture of a polymeric adhesive material and an additive selected from a salt, a polyelectrolyte, a polymer electrolyte, a solid electrolyte, a conductive metal powder, a ferrofluid, a non-reactive solvent, a conductive organic compound, and combinations thereof. The additive enables the volume resistivity of the adhesive layer to be controlled. Also, in an encapsulated electrophoretic medium comprising capsules in a polymeric binder, the volume resistivity of the binder can be controlled in a similar manner.

51 Claims, 4 Drawing Sheets

U.S. PATENT DOCUMENTS

| | | | |
|---|---|---|---|
| 5,930,026 A | 7/1999 | Jacobson et al. | 359/296 |
| 5,961,804 A | 10/1999 | Jacobson et al. | 204/606 |
| 6,017,584 A | 1/2000 | Albert et al. | 427/213.3 |
| 6,054,071 A | 4/2000 | Mikkelsen, Jr. | 269/1.36 |
| 6,055,091 A | 4/2000 | Sheridon et al. | 359/296 |
| 6,067,185 A | 5/2000 | Albert et al. | 359/296 |
| 6,097,531 A | 8/2000 | Sheridon | 359/296 |
| 6,118,426 A | 9/2000 | Albert et al. | 250/216 |
| 6,120,588 A | 9/2000 | Jacobson | 359/296 |
| 6,120,839 A | 9/2000 | Comiskey et al. | 359/296 |
| 6,124,851 A | 9/2000 | Jacobson | 438/99 |
| 6,128,124 A | 10/2000 | Silverman | 445/24 |
| 6,130,773 A | 10/2000 | Jacobson et al. | 359/265 |
| 6,130,774 A | 10/2000 | Albert et al. | 345/107 |
| 6,137,467 A | 10/2000 | Sheridon et al. | 345/107 |
| 6,140,405 A | 10/2000 | Eckstein et al. | 359/296 |
| 6,144,361 A | 11/2000 | Gordon, II et al. | 345/107 |
| 6,147,791 A | 11/2000 | Sheridon | 345/1.3 |
| 6,172,798 B1 | 1/2001 | Albert et al. | 345/107 |
| 6,177,921 B1 | 1/2001 | Comiskey et al. | 264/1.36 |
| 6,184,331 B1 | 2/2001 | Chiang et al. | 345/107 |
| 6,184,856 B1 | 2/2001 | Gordon, II et al. | 345/107 |
| 6,225,971 B1 | 5/2001 | Gordon, II et al. | 345/107 |
| 6,232,950 B1 | 5/2001 | Albert et al. | 345/107 |
| 6,241,921 B1 | 6/2001 | Jacobson et al. | 264/1.36 |
| 6,249,271 B1 | 6/2001 | Albert et al. | 345/107 |
| 6,252,564 B1 | 6/2001 | Albert et al. | 345/1.3 |
| 6,262,706 B1 | 7/2001 | Albert et al. | 345/107 |
| 6,262,833 B1 | 7/2001 | Loxley et al. | 359/296 |
| 6,271,823 B1 | 8/2001 | Gordon, II et al. | 345/107 |
| 6,300,932 B1 | 10/2001 | Albert | 345/107 |
| 6,301,038 B1 | 10/2001 | Fitzmaurice et al. | 359/265 |
| 6,312,304 B1 | 11/2001 | Duthaler et al. | 445/24 |
| 6,312,971 B1 | 11/2001 | Amundson et al. | 438/99 |
| 6,323,989 B1 | 11/2001 | Jacobson et al. | 359/296 |
| 6,327,072 B1 | 12/2001 | Comiskey et al. | 359/296 |
| 6,376,828 B1 | 4/2002 | Comiskey | 250/216 |
| 6,377,387 B1 | 4/2002 | Duthaler et al. | 359/296 |
| 6,392,785 B1 | 5/2002 | Albert et al. | 345/107 |
| 6,392,786 B1 | 5/2002 | Albert | 445/74 |
| 6,413,790 B1 | 7/2002 | Duthaler et al. | 345/107 |
| 6,422,687 B1 | 7/2002 | Jacobson | 257/197 |
| 6,445,374 B1 | 9/2002 | Albert et al. | 345/107 |
| 6,445,489 B1 | 9/2002 | Jacobson et al. | 445/74 |
| 6,459,418 B1 | 10/2002 | Comiskey et al. | 345/107 |
| 6,473,072 B1 | 10/2002 | Comiskey et al. | 359/296 |
| 6,480,182 B1 | 11/2002 | Turner et al. | 347/25 |
| 6,498,114 B1 | 12/2002 | Amundson et al. | 345/107 |
| 6,504,524 B1 | 1/2003 | Gates et al. | 359/265 |
| 6,506,438 B1 | 1/2003 | Duthaler et al. | 257/40 |
| 6,512,354 B1 | 1/2003 | Jacobson et al. | 359/296 |
| 6,515,649 B1 | 2/2003 | Albert et al. | 345/107 |
| 6,518,949 B1 | 2/2003 | Drzaic | 345/107 |
| 6,521,489 B1 | 2/2003 | Duthaler et al. | 438/149 |
| 6,531,997 B1 | 3/2003 | Gates et al. | 345/107 |
| 6,535,197 B1 | 3/2003 | Comiskey et al. | 345/107 |
| 6,538,801 B1 | 3/2003 | Jacobson et al. | 359/296 |
| 6,545,291 B1 | 4/2003 | Amundson et al. | 257/90 |
| 6,580,545 B1 | 6/2003 | Morrison et al. | 359/265 |
| 6,639,578 B1 | 10/2003 | Comiskey et al. | 345/107 |
| 6,652,075 B1 | 11/2003 | Jacobson | 347/55 |
| 6,657,772 B1 | 12/2003 | Loxley | 359/296 |
| 6,664,944 B1 | 12/2003 | Albert et al. | 345/107 |
| D485,294 S | 1/2004 | Albert | D18/26 |
| 6,672,921 B1 | 1/2004 | Liang et al. | 445/24 |
| 6,680,725 B1 | 1/2004 | Jacobson | 345/107 |
| 6,683,333 B1 | 1/2004 | Kazlas et al. | 257/197 |
| 6,693,620 B1 | 2/2004 | Herb et al. | 345/107 |
| 6,704,133 B1 | 3/2004 | Gates et al. | 359/296 |
| 6,710,540 B1 | 3/2004 | Albert et al. | 313/498 |
| 6,721,083 B1 | 4/2004 | Jacobson et al. | 359/296 |
| 6,724,519 B1 | 4/2004 | Comiskey et al. | 359/296 |
| 6,727,881 B1 | 4/2004 | Albert et al. | 345/107 |
| 6,738,050 B1 | 5/2004 | Comiskey et al. | 345/173 |
| 6,750,473 B1 | 6/2004 | Amundson et al. | 257/40 |
| 6,753,999 B1 | 6/2004 | Zehner et al. | 359/296 |
| 6,788,449 B1 | 9/2004 | Liang et al. | 359/296 |
| 6,816,147 B1 | 11/2004 | Albert | 345/107 |
| 6,819,471 B1 | 11/2004 | Amundson et al. | 359/296 |
| 6,822,782 B1 | 11/2004 | Honeyman et al. | 359/296 |
| 6,825,068 B1 | 11/2004 | Denis et al. | 438/149 |
| 6,825,829 B1 | 11/2004 | Albert et al. | 345/107 |
| 6,825,970 B1 | 11/2004 | Goenaga et al. | 359/296 |
| 6,831,769 B1 | 12/2004 | Holman et al. | 359/296 |
| 6,839,158 B1 | 1/2005 | Albert et al. | 359/296 |
| 6,842,167 B1 | 1/2005 | Albert et al. | 345/107 |
| 6,842,279 B1 | 1/2005 | Amundson | 438/149 |
| 6,842,657 B1 | 1/2005 | Drzaic et al. | 359/296 |
| 6,864,875 B1 | 3/2005 | Drzaic et al. | 359/296 |
| 6,865,010 B1 | 3/2005 | Duthaler et al. | 345/107 |
| 6,866,760 B1 | 3/2005 | Paolini, Jr. et al. | 359/296 |
| 6,870,661 B1 | 3/2005 | Pullen et al. | 359/296 |
| 2002/0027635 A1 | 3/2002 | Sakamaki et al. | 257/40 |
| 2002/0060321 A1 | 5/2002 | Kazlas et al. | 345/173 |
| 2002/0063661 A1 | 5/2002 | Comiskey et al. | 345/107 |
| 2002/0090980 A1 | 7/2002 | Wilcox et al. | 359/296 |
| 2002/0113770 A1 | 8/2002 | Jacobson et al. | 359/296 |
| 2002/0130832 A1 | 9/2002 | Baucom et al. | 313/498 |
| 2002/0180687 A1 | 12/2002 | Webber | 359/296 |
| 2003/0011560 A1 | 1/2003 | Albert et al. | 345/107 |
| 2003/0020844 A1 | 1/2003 | Albert et al. | 438/146 |
| 2003/0102858 A1 | 6/2003 | Jacobson et al. | 345/30 |
| 2003/0132908 A1 | 7/2003 | Herb et al. | 156/292 |
| 2003/0137521 A1 | 7/2003 | Zehner et al. | 204/471 |
| 2003/0151702 A1 | 8/2003 | Morrison et al. | 359/296 |
| 2003/0214695 A1 | 11/2003 | Abramson et al. | 345/107 |
| 2003/0222315 A1 | 12/2003 | Amundson et al. | 204/601 |
| 2004/0012839 A1 | 1/2004 | Cao et al. | 359/296 |
| 2004/0014265 A1 | 1/2004 | Kazlas et al. | 359/296 |
| 2004/0027327 A1 | 2/2004 | LeCain et al. | 359/296 |
| 2004/0075634 A1 | 4/2004 | Gates | 204/471 |
| 2004/0094422 A1 | 5/2004 | Pullen et al. | 156/292 |
| 2004/0105036 A1 | 6/2004 | Danner et al. | 345/30 |
| 2004/0112525 A1 | 6/2004 | Pereira et al. | 438/146 |
| 2004/0112750 A1 | 6/2004 | Jacobson et al. | 345/107 |
| 2004/0119681 A1 | 6/2004 | Albert et al. | 359/296 |
| 2004/0136048 A1 | 7/2004 | Arango et al. | 359/296 |
| 2004/0155857 A1 | 8/2004 | Duthaler et al. | 345/107 |
| 2004/0180476 A1 | 9/2004 | Kazlas et al. | 438/146 |
| 2004/0196215 A1 | 10/2004 | Duthaler et al. | 345/30 |
| 2004/0216837 A1 | 11/2004 | Pereira et al. | 156/292 |
| 2004/0226820 A1 | 11/2004 | Webber et al. | 204/471 |
| 2004/0233509 A1 | 11/2004 | Zhang et al. | 359/296 |
| 2004/0252360 A1 | 12/2004 | Webber et al. | 359/296 |
| 2004/0257635 A1 | 12/2004 | Paolini, Jr. et al. | 359/296 |
| 2005/0000813 A1 | 1/2005 | Pullen et al. | 204/601 |
| 2005/0035941 A1 | 2/2005 | Albert et al. | 345/107 |

FOREIGN PATENT DOCUMENTS

| | | |
|---|---|---|
| WO | WO 00/05704 | 2/2000 |
| WO | WO 00/36560 | 6/2000 |
| WO | WO 00/38000 | 6/2000 |
| WO | WO 00/67110 | 11/2000 |
| WO | WO 00/67327 | 11/2000 |
| WO | WO 01/07961 | 2/2001 |
| WO | WO 01/27690 | 4/2001 |
| WO | WO 03/107315 | 12/2003 |

OTHER PUBLICATIONS

Bach, U., et al., "Nanomaterials-Based Electrochromics for Paper-Quality Displays", Adv. Mater, 14(11), 845 (2002).

Chen, Y., et al., "A Conformable Electronic Ink Display using a Foil-Based a-Si TFT Array", SID 01 Digest, 157 (Jun. 2001).

Comiskey, B., et al., "An electrophoretic ink for all-printed reflective electronic displays", Nature, 394, 253 (1998).

Comiskey, B., et al., "Electrophoretic Ink: A Printable Display Material", SID 97 Digest (1997), p. 75.

Drzaic, P., et al., "A Printed and Rollable Bistable Electronic Display", SID 98 Digest (1998), p. 1131.

Duthaler, G., et al., "Active-Matrix Color Displays Using Electrophoretic Ink and Color Filters", SID 02 Digest, 1374 (2002).

Jacobson, J., et al., "The last book", IBM Systems J., 36, 457 (1997).

Jo, G-R, et al., "Toner Display Based on Particle Movements", Chem. Mater, 14, 664 (2002).

Kazlas, P., et al., "12.1" SVGA Microencapsulated Electrophoretic Active Matrix Display for Information Applicances, SID 01 Digest, 152 (Jun. 2001).

Kitamura, T., et al., "Electrical toner movement for electronic paper-like display", Asia Display/IDW '01, p. 1517, Paper HCS1-1 (2001).

O'Regan, B. et al., "A Low Cost, High-efficiency Solar Cell Based on Dye-sensitized colloidal TiO2 Films", Nature, vol. 353, Oct. 24, 1991, 773-740.

Pitt, M.G., et al., "Power Consumption of Microencapsulated Electrophoretic Displays for Smart Handheld Applications", SID 02 Digest, 1378 (2002).

Webber, R., "Image Stability in Active-Matrix Microencapsulated Electrophoretic Displays", SID 02 Digest, 126 (2002).

Wood, D., "An Electrochromic Renaissance?" Information Display, 18(3), 24 (Mar. 2002).

Yamaguchi, Y., et al., "Toner display using insulative particles charged triboelectrically", Asia Display/IDW '01, p. 1729, Paper AMD4-4 (2001).

\* cited by examiner

ELECTRO-OPTIC ASSEMBLIES, AND MATERIALS FOR USE THEREIN

REFERENCE TO RELATED APPLICATIONS

This application claims benefit of Provisional Application Ser. No. 60/320,059, filed Mar. 27, 2003.

This application is also related to (a) application Ser. No. 10/064,389, filed Jul. 9, 2002 (Publication No. 2003/0025855, now U.S. Pat. No. 6,831,769), which itself claims benefit of Provisional Application Ser. No. 60/304,117, filed Jul. 9, 2001; (b) application Ser. No. 10/249,957, filed May 22, 2003 (Publication 2004/0027327), which itself claims benefit of Provisional Application Ser. No. 60/319,300, filed Jun. 10, 2002, and Provisional application Ser. No. 60/320,186, filed May 12, 2003; and (c) Application Ser. No. 10/605,024, filed Sep. 2, 2003 (Publication No. 2004/0155857), which itself claims benefit of Provisional Application Ser. No. 60/319,516, filed Sep. 2, 2002.

The entire contents of these copending applications, and of all other U.S. patents and published and copending applications mentioned below, are herein incorporated by reference.

BACKGROUND OF INVENTION

Electro-optic assemblies useful in the production of electro-optic displays, and to materials for use in such assemblies are disclosed. More specifically, binders and adhesive compositions having controlled volume resistivity, and electro-optic assemblies incorporating such materials, are disclosed. The materials disclosed herein may be useful in applications other than electro-optic displays.

Electro-optic displays comprise a layer of electro-optic material, a term which is used herein in its conventional meaning in the art to refer to a material having first and second display states differing in at least one optical property, the material being changed from its first to its second display state by application of an electric field to the material. The optical property is typically color perceptible to the human eye, but may be another optical property, such as optical transmission, reflectance, luminescence or, in the case of displays intended for machine reading, pseudo-color in the sense of a change in reflectance of electromagnetic wavelengths outside the visible range.

The electro-optic displays of the present invention typically contain an electro-optic material, which is a solid in the sense that the electro-optic material has solid external surfaces, although the material may, and often does, have internal liquid- or gas-filled spaces, and to methods for assembling displays using such an electro-optic material. Such displays using solid electro-optic materials may hereinafter for convenience be referred to as "solid electro-optic displays". Thus, the term "solid electro-optic displays" includes rotating bichromal member displays (see below), encapsulated electrophoretic displays, microcell electrophoretic displays and encapsulated liquid crystal displays.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in published U.S. Patent Application No. 2002/0180687 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

Several types of electro-optic displays are known. One type of electro-optic display is a rotating bichromal member type as described, for example, in U.S. Pat. Nos. 5,808,783; 5,777,782; 5,760,761; 6,054,071 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical), which have two or more sections with differing optical characteristics, and an internal dipole. These bodies are suspended within liquid-filled vacuoles within a matrix, the vacuoles being filled with liquid so that the bodies are free to rotate. The appearance of the display is changed to applying an electric field thereto, thus rotating the bodies to various positions and varying which of the sections of the bodies is seen through a viewing surface. This type of electro-optic medium is typically bistable.

Another type of electro-optic display uses an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18(3), 24 (March 2002). See also Bach, U., et al., Adv. Mater., 2002, 14(11), 845. Nanochromic films of this type are also described, for example, in U.S. Pat. No. 6,301,038, International Application Publication No. WO 01/27690, and in U.S. Patent Application 2003/0214695. This type of medium is also typically bistable.

Another type of electro-optic display, which has been the subject of intense research and development for a number of years, is the particle-based electrophoretic display, in which a plurality of charged particles moves through a suspending fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

Numerous patents and applications assigned to or in the names of the Massachusetts Institute of Technology (MIT) and E Ink Corporation have recently been published describing encapsulated electrophoretic media. Such encapsulated media comprise numerous small capsules, each of which itself comprises an internal phase containing electrophoretically-mobile particles suspended in a liquid suspension medium, and a capsule wall surrounding the internal phase. Typically, the capsules are themselves held within a polymeric binder to form a coherent layer positioned between two electrodes. Encapsulated media of this type are described, for example, in U.S. Pat. Nos. 5,930,026; 5,961,804; 6,017,584; 6,067,185; 6,118,426; 6,120,588; 6,120, 839; 6,124,851; 6,130,773; 6,130,774; 6,172,798; 6,177,921; 6,232,950; 6,249,721; 6,252,564; 6,262,706; 6,262,833; 6,300,932; 6,312,304; 6,312,971; 6,323,989; 6,327,072; 6,376,828; 6,377,387; 6,392,785; 6,392,786; 6,413,790; 6,422,687; 6,445,374; 6,445,489; 6,459,418; 6,473,072; 6,480,182; 6,498,114; 6,504,524; 6,506,438; 6,512,354; 6,515,649; 6,518,949; 6,521,489; 6,531,997; 6,535,197; 6,538,801; 6,545,291; 6,580,545; 6,639,578; 6,652,075; 6,657,772; 6,664,944; 6,680,725; 6,683,333; and 6,704,133; and U.S. patent applications Publication Nos. 2002/0019081; 2002/0021270; 2002/0053900; 2002/0060321; 2002/0063661; 2002/0063677; 2002/0090980; 2002/0106847; 2002/0113770; 2002/0130832; 2002/0131147; 2002/0145792; 2002/0171910; 2002/0180687; 2002/0180688; 2002/0185378; 2003/0011560; 2003/0011868; 2003/0020844; 2003/0025855; 2003/0034949; 2003/0038755; 2003/0053189; 2003/0096113; 2003/0102858; 2003/0132908; 2003/0137521; 2003/0137717; 2003/0151702; 2003/0189749; 2003/0214695; 2003/0214697; 2003/0222315; 2004/0008398; 2004/0012839; 2004/0014265; and 2004/0027327; and International Applications Publication Nos. WO 99/67678; WO 00/05704; WO 00/38000; WO 00/38001; WOOO/36560; WO 00/67110; WO 00/67327; WO 01/07961; WO 01/08241; WO 03/092077; and WO 03/107,315.

Many of the aforementioned patents and applications recognize that the walls surrounding the discrete microcapsules in an encapsulated electrophoretic medium could be replaced by a continuous phase, thus producing a so-called "polymer-dispersed electrophoretic display" in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned 2002/0131147. Accordingly, for purposes of the present application, such polymer-dispersed electrophoretic media are regarded as sub-species of encapsulated electrophoretic media.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; and other similar techniques.) Thus, the resulting display can be flexible. Further, because the display medium can be printed (using a variety of methods), the display itself can be made inexpensively.

A related type of electrophoretic display is a so-called "microcell electrophoretic display". In a microcell electrophoretic display, the charged particles and the suspending fluid are not encapsulated within capsules but instead are retained within a plurality of cavities formed within a carrier medium, typically a polymeric film. See, for example, International Application Publication No. WO 02/01281, and U.S. Patent Application Publication No. 2002/0075556, both assigned to Sipix Imaging, Inc.

Other types of electro-optic materials, for example, polymer-dispersed liquid crystal, may also be used in the displays of the present invention.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, the aforementioned U.S. Pat. Nos. 6,130,774 and 6,172,798, and 5,872,552; 6,144,361; 6,271,823; 6,225,971; and 6,184,856. Dielectrophoretic displays, which are similar to electrophoretic displays but rely upon variations in electric field strength, can operate in a similar mode; see U.S. Pat. No. 4,418,346.

In addition to the layer of electro-optic material, an electro-optic display normally comprises at least two other layers disposed on opposed sides of the electro-optic material, one of these two layers being an electrode layer. In most such displays both the layers are electrode layers, and one or both of the electrode layers are patterned to define the pixels of the display. For example, one electrode layer may be patterned into elongate row electrodes and the other into elongate column electrodes running at right angles to the row electrodes, the pixels being defined by the intersections of the row and column electrodes. Alternatively, and more commonly, one electrode layer has the form of a single continuous electrode and the other electrode layer is patterned into a matrix of pixel electrodes, each of which defines one pixel of the display. In another type of electro-optic display, which is intended for use with a stylus, print head or similar movable electrode separate from the display, only one of the layers adjacent the electro-optic layer comprises an electrode, the layer on the opposed side of the electro-optic layer typically being a protective layer intended to prevent the movable electrode damaging the electro-optic layer.

The manufacture of a three-layer electro-optic display normally involves at least one lamination operation. For example, in several of the aforementioned MIT and E Ink patents and applications, there is described a process for manufacturing an encapsulated electrophoretic display in which an encapsulated electrophoretic medium comprising capsules in a binder is coated on to a flexible substrate comprising indium-tin-oxide (ITO) or a similar conductive coating (which acts as an one electrode of the final display) on a plastic film, the capsules/binder coating being dried to form a coherent layer of the electrophoretic medium firmly adhered to the substrate. Separately, a backplane, containing an array of pixel electrodes and an appropriate arrangement of conductors to connect the pixel electrodes to drive circuitry, is prepared. To form the final display, the substrate having the capsule/binder layer thereon is laminated to the backplane using a lamination adhesive. (A very similar process can be used to prepare an electrophoretic display useable with a stylus or similar movable electrode by replacing the backplane with a simple protective layer, such as a plastic film, over which the stylus or other movable electrode can slide.) In one preferred form of such a process, the backplane is itself flexible and is prepared by printing the pixel electrodes and conductors on a plastic film or other flexible substrate. The obvious lamination technique for mass production of displays by this process is roll lamination using a lamination adhesive. Similar manufacturing techniques can be used with other types of electro-optic displays. For example, a microcell electrophoretic medium or a rotating bichromal member medium may be laminated to a backplane in substantially the same manner as an encapsulated electrophoretic medium.

In the processes described above, the lamination of the substrate carrying the electro-optic layer to the backplane may advantageously be carried out by vacuum lamination. Vacuum lamination is effective in expelling air from between the two materials being laminated, thus avoiding unwanted air bubbles in the final display; such air bubbles may introduce undesirable artifacts in the images produced on the display. However, vacuum lamination of the two parts of an electro-optic display in this manner imposes stringent requirements upon the lamination adhesive used, especially in the case of a display using an encapsulated electrophoretic medium. The lamination adhesive should have sufficient adhesive strength to bind the electro-optic layer to the layer (typically an electrode layer) to which it is to be laminated, and in the case of an encapsulated electrophoretic medium, the adhesive should also have sufficient adhesive strength to mechanically hold the capsules together. If the electro-optic display is to be of a flexible type (and one of the important advantages of rotating bichromal member and encapsulated electrophoretic displays is that they can be made flexible), the adhesive should have sufficient flexibility not to introduce defects into the display when the display is flexed. The lamination adhesive should have adequate flow properties at the lamination temperature to ensure high quality lamination, and in this regard, the demands of laminating encapsulated electrophoretic and some other types of electro-optic media are unusually difficult; the lamination has be conducted at a temperature of not more than about 130° C. since the medium cannot be exposed to substantially higher temperatures without damage, but the flow of the adhesive must cope with the relatively uneven surface of the capsule-containing layer, the surface of which is rendered irregular by the underlying capsules. The lamination temperature should indeed be kept as low as possible, and room temperature lamination would be ideal, but no commercial adhesive has been found which permits such room temperature lamination. The lamination adhesive should be chemically compatible with all the other materials in the display.

As discussed in detail in the aforementioned copending application Ser. No. 10/064,389, a lamination adhesive used in an electro-optic display should meet certain electrical criteria, and this introduces considerable problems in the selection of the lamination adhesive. Commercial manufacturers of lamination adhesives naturally devote considerable effort to ensuring that properties, such as strength of adhesion and lamination temperatures, of such adhesives are adjusted so that the adhesives perform well in their major applications, which typically involve laminating polymeric and similar films. However, in such applications, the electrical properties of the lamination adhesive are not relevant, and consequently the commercial manufacturers pay no heed to such electrical properties. Indeed, substantial variations (of up to several fold) in certain electrical properties may exist between different batches of the same commercial lamination adhesive, presumably because the manufacturer was attempting to optimize non-electrical properties of the lamination adhesive (for example, resistance to bacterial growth) and was not at all concerned about resulting changes in electrical properties.

However, in electro-optic displays, in which the lamination adhesive is normally located between the electrodes, which apply the electric field needed to change the electrical state of the electro-optic medium, the electrical properties of the adhesive may become crucial. As will be apparent to electrical engineers, the volume resistivity of the lamination adhesive becomes important, since the voltage drop across the electro-optic medium is essentially equal to the voltage drop across the electrodes, minus the voltage drop across the lamination adhesive. If the resistivity of the adhesive layer is too high, a substantial voltage drop will occur within the adhesive layer, requiring an increase in voltage across the electrodes. Increasing the voltage across the electrodes in this manner is undesirable, since it increases the power consumption of the display, and may require the use of more complex and expensive control circuitry to handle the increased voltage involved. On the other hand, if the adhesive layer, which extends continuously across the display, is in contact with a matrix of electrodes, as in an active matrix display, the volume resistivity of the adhesive layer should not be too low, or lateral conduction of electric current through the continuous adhesive layer may cause undesirable cross-talk between adjacent electrodes. Also, since the volume resistivity of most materials decreases rapidly with increasing temperature, if the volume resistivity of the adhesive is too low, the performance of the display at temperatures substantially above room temperature is adversely affected. For these reasons, there is an optimum range of lamination adhesive resistivity values for use with any given electro-optic medium, this range varying with the resistivity of the electro-optic medium. The volume resistivities of encapsulated electrophoretic media are typically around $10^{10}$ ohm cm, and the resistivities of other electro-optic media are usually of the same order of magnitude. Accordingly, the volume resistivity of the lamination adhesive should normally be around $10^8$ to $10^{12}$ ohm cm, or about $10^9$ to $10^{11}$ ohm cm, at the operating temperature of the display, typically around 20° C. The lamination adhesive should also have a variation of volume resistivity with temperature which is similar to that of the electro-optic medium itself.

The number of commercial materials which can meet most of the previously discussed, rather disparate requirements for a lamination adhesive for use in an electro-optic display is small, and in practice a small number of water-dispersed urethane emulsions have been used for this purpose. A similar group of materials have been used as the binder for an encapsulated electrophoretic medium.

However, the use of such polyester-based urethane emulsions as lamination adhesives is still a not entirely satisfactory compromise between the desired mechanical and electrical properties. Lamination adhesives such as acrylic polymers and pressure sensitive adhesives are available with much better mechanical properties, but the electrical properties of these materials are unsuitable for use in electro-optic displays. Moreover, hitherto there has been no satisfactory way of varying the electrical properties of the urethane emulsions to "fine tune" them to match the electrical properties of a specific electro-optic medium. Accordingly, it would be highly advantageous if some way could be found to "decouple" the mechanical and electrical properties of a lamination adhesive so that each set of properties could be optimized separately.

Furthermore, in considering the choice of a lamination adhesive for use in an electro-optic display, attention must be paid to the process by which the display is to be assembled. Most prior art methods for final lamination of electrophoretic displays are essentially batch methods in which the electro-optic medium, the lamination adhesive and the backplane are only brought together immediately prior to final assembly, and it is desirable to provide methods better adapted for mass production. However, the aforementioned copending application Ser. No. 10/249,957 describes a method of assembling a solid electro-optic display (including a particle-based electrophoretic display), which is well adapted for mass production. Essentially, this copending application describes a so-called "front plane laminate" ("FPL") which comprises, in order, a light-transmissive electrically-conductive layer; a layer of a solid electro-optic medium in electrical contact with the electrically-conductive layer; an adhesive layer; and a release sheet. Typically, the light-transmissive electrically-conductive layer will be carried on a light-transmissive substrate, which is preferably flexible, in the sense that the substrate can be manually wrapped around a drum (say) 10 inches (254 mm) in diameter without permanent deformation. The term "light-transmissive" is used in this copending application and herein to mean that the layer thus designated transmits sufficient light to enable an observer, looking through that layer, to observe the change in display states of the electro-optic medium, which will be normally be viewed through the electrically-conductive layer and adjacent substrate (if present). The substrate will be typically be a polymeric film, and will normally have a thickness in the range of about 1 to about 25 mil (25 to 634 $\mu$m), preferably about 2 to about 10 mil (51 to 254 $\mu$m). The electrically-conductive layer is conveniently a thin metal layer of, for example, aluminum or indium-tin-oxide, or may be a conductive polymer. Polyethylene terephthalate (PET) films coated with aluminum or ITO are available commercially, for example as "aluminized Mylar" ("Mylar" is a Registered Trade Mark) from E.I. du Pont de Nemours & Company, Wilmington Del., and such commercial materials may be used with good results in the front plane laminate.

Assembly of an electro-optic display using such a front plane laminate may be effected by removing the release sheet from the front plane laminate and contacting the adhesive layer with the backplane under conditions effective to cause the adhesive layer to adhere to the backplane, thereby securing the adhesive layer, electro-optic medium layer and electrically-conductive layer to the backplane. This process is well-adapted to mass production since the front plane laminate may be mass produced, typically using roll-to-roll coating techniques, and then cut into pieces of any size needed for use with specific backplanes.

The aforementioned copending application Ser. No. 10/249,957 also describes a method for testing the electro-optic medium in a front plane laminate prior to incorporation of the front plane laminate into a display. In this testing method, the release sheet is provided with an electrically conductive layer, and a voltage sufficient to change the optical state of the electro-optic medium is applied between this electrically conductive layer and the electrically conductive layer on the opposed side of the electro-optic medium. Observation of the electro-optic medium will then reveal any faults in the medium, thus avoiding laminating faulty electro-optic medium into a display, with the resultant cost of scrapping the entire display, not merely the faulty front plane laminate.

The aforementioned copending application Ser. No. 10/249,957 also describes a second method for testing the electro-optic medium in a front plane laminate by placing an electrostatic charge on the release sheet, thus forming an image on the electro-optic medium. This image is then observed in the same way as before to detect any faults in the electro-optic medium.

The aforementioned copending application Ser. No. 10/605,024 describes a so-called "double release film" which is essentially a simplified version of the front plane laminate previously described. One form of the double release sheet comprises a layer of a solid electro-optic medium sandwiched between two adhesive layers, one or both of the adhesive layers being covered by a release sheet. Another form of the double release sheet comprises a layer of a solid electro-optic medium sandwiched between two release sheets. Both forms of the double release film are intended for use in a process generally similar to the process for assembling an electro-optic display from a front plane laminate already described, but involving two separate laminations; typically, in a first lamination the double release sheet is laminated to a front electrode to form a front sub-assembly, and then in a second lamination the front sub-assembly is laminated to a backplane to form the final display.

In view of the advantages of the assembly method using a front plane laminate described in the aforementioned copending application Ser. No. 10/249,957, it is desirable that a lamination adhesive be capable of being incorporated into such a front plane laminate. It is also desirable that a lamination adhesive be capable of being incorporated into a double release film as previously described.

SUMMARY OF INVENTION

Accordingly, in one aspect there is provided an electro-optic assembly comprising first and second substrates, and an adhesive layer and a layer of electro-optic material disposed between the first and second substrates, the adhesive layer comprising a mixture of a polymeric adhesive material and an additive selected from a salt, a polyelectrolyte, a polymer electrolyte, a solid electrolyte, and combinations thereof. The adhesive layer containing the additive may comprise from about $10^{-6}$ to about $10^{-4}$ moles of additive per gram of the polymeric adhesive material. Typically, the layer will comprise from about $10^{-5}$ to about $10^{-4}$ moles of additive per gram of polymeric adhesive material. The layer may comprise a polyurethane, vinyl acetate, vinyl acetate ethylene, epoxy, or a polyacrylic based adhesive.

In one embodiment, the adhesive layer used in this electro-optic assembly may comprise a mixture of the polymeric adhesive material and a salt. The salt may be, for example, an inorganic salt, an organic salt, or a combination thereof. In one particular embodiment, the salt comprises potassium acetate. In an alternative embodiment, the salt may comprise a quaternary ammonium salt, for example a tetraalkylammonium salt, such as tetrabutylammonium chloride or hexafluorophosphate.

In embodiments wherein the additive is a polyelectrolyte, the polyelectrolyte may comprise, for example, a salt of a polyacid such as, but not limited to, an alkali metal salt of polyacrylic acid.

The adhesive layer containing the additive may provide other functions besides an adhesive function. For example, the layer may be provided with regions of differing colors and serve as a color filter. Alternatively, the layer may comprise an optical biasing element.

In the electro-optic assembly, at least one of the first and second substrates may comprise an electrode. In one particular embodiment, each of the first and second substrates comprises at least one electrode. In another particular embodiment, the first substrate may comprise a light-transmissive electrically-conductive layer (which can act as an electrode), the second substrate may comprise a release sheet, and the electro-optic medium may be a solid electro-optic medium; thus, the entire electro-optic assembly will have the form of a front plane laminate as described in the aforementioned copending application Ser. No. 10/249,957.

In a further aspect of the present invention, there is provided an article of manufacture (a double release sheet) comprising: a layer of a solid electro-optic medium having first and second surfaces on opposed sides thereof; a first adhesive layer on the first surface of the layer of solid electro-optic medium; a release sheet disposed on the opposed side of the first adhesive layer from the layer of solid electro-optic medium; and a second adhesive layer on the second surface of the layer of solid electro-optic medium, at least one of the first and second adhesive layers comprising a mixture of a polymeric adhesive material and an additive selected from a salt, a polyelectrolyte, a polymer electrolyte, a solid electrolyte, and combinations thereof.

In another aspect of the present invention, there is provided an electro-optic assembly comprising first and second substrates, and an adhesive layer and a layer of electro-optic material disposed between the first and second substrates, the adhesive layer comprising a mixture of a polymeric adhesive material and an additive selected from a conductive metal powder, a ferrofluid, a non-reactive solvent, a conductive organic compound, and combinations thereof. The conductive metal powder may be, for example, nickel.

In a still further aspect of the present invention, there is provided an article of manufacture (a double release sheet) comprising: a layer of a solid electro-optic medium having first and second surfaces on opposed sides thereof; a first adhesive layer on the first surface of the layer of solid electro-optic medium; a release sheet disposed on the opposed side of the first adhesive layer from the layer of solid electro-optic medium; and a second adhesive layer on the second surface of the layer of solid electro-optic medium, at least one of the first and second adhesive layers comprising a mixture of a polymeric adhesive material and an additive selected from a conductive metal powder, a ferrofluid, a non-reactive solvent, a conductive organic compound, and combinations thereof.

In another aspect, there is provided an electrophoretic medium comprising a plurality of capsules, each of the capsules comprising a capsule wall, a suspending fluid encapsulated within the capsule wall and a plurality of electrically charged particles suspended in the suspending fluid and capable of moving therethrough on application of an electric field to the medium, the medium further comprising a binder surrounding the capsules, the binder comprising a mixture of a polymeric adhesive material and an additive selected from a salt, a polyelectrolyte, a polymer electrolyte, a solid electrolyte, and combinations thereof. The binder containing the additive may comprise from about $10^{-6}$ to about $10^{-4}$ moles of additive per gram of binder. Typically, the binder will comprise from about $10^{-5}$ to about $10^{-4}$ moles of salt per gram of binder. The binder may comprise a polyurethane, vinyl acetate, vinyl acetate ethylene, epoxy, or a polyacrylic based adhesive.

In one embodiment, the binder used in this electrophoretic medium may comprise a mixture of the polymeric adhesive material and a salt. The salt may be, for example, an inorganic salt, organic salt, or combination thereof. In one particular embodiment, the salt comprises potassium acetate. In an alternative embodiment, the salt may comprise a quaternary ammonium salt, for example a tetraalkylammonium salt, such as tetrabutyl ammonium chloride or hexafluorophosphate.

In embodiments wherein the additive in the binder is a polyelectrolyte, the polyelectrolyte may comprise a salt of a polyacid, for example an alkali metal salt of polyacrylic acid.

The binder containing the additive may provide other functions besides an adhesive function. For example, the binder may comprise an optical biasing element.

In yet another aspect, there is provided an electrophoretic medium comprising a plurality of capsules, each of the capsules comprising a capsule wall, a suspending fluid encapsulated within the capsule wall and a plurality of electrically charged particles suspended in the suspending fluid and capable of moving therethrough on application of an electric field to the medium, the medium further comprising a binder surrounding the capsules, the binder comprising a mixture of a polymeric adhesive material and an additive selected from a conductive metal powder, a ferrofluid, a non-reactive solvent, a conductive organic compound, and combinations thereof.

In another aspect, there is provided an adhesive comprising a mixture of a polymeric adhesive material and an additive selected from a salt, a polyelectrolyte, a polymer electrolyte, a solid electrolyte, and combinations thereof. In this adhesive, the polymeric adhesive material may be selected from a polyurethane, vinyl acetate, vinyl acetate ethylene, an epoxy, a polyacrylic-based adhesive, and combinations thereof.

Finally, there is provided an adhesive comprising a mixture of a polymeric adhesive material and an additive selected from a conductive metal powder, a ferrofluid, a non-reactive solvent, a conductive organic compound, and combinations thereof. In this adhesive, the polymeric adhesive material may be selected from a polyurethane, vinyl acetate, vinyl acetate ethylene, an epoxy, a polyacrylic-based adhesive, and combinations thereof.

DETAILED DESCRIPTION

As already indicated, certain additives to control the volume resistivity of adhesive materials used, for example, in adhesive layers of electro-optic assemblies and displays, and in binders surrounding the capsules of encapsulated electrophoretic media, are disclosed herein. The adhesive layers and binders disclosed herein enable the volume resistivity to be varied without substantially varying the mechanical properties of the adhesive layer or binder. The adhesive layers and binders, through the addition of one or more additives, expand the selection of adhesive materials which have desirable mechanical properties but which could not otherwise be used because their volume resistivities are unsuitable. Thus, one can "fine tune" the volume resistivity of an adhesive layer or binder, i.e., to adjust the volume resistivity of the material to an optimum value for a particular display or electrophoretic medium.

The electro-optic assembly of the present invention may constitute a complete electro-optic display or only a sub-assembly of such a display. As already indicated, and as discussed at length in the aforementioned E Ink and MIT patents and applications, a complete electro-optic display requires the presence of at least one, and normally two, electrodes to produce the electric field necessary to vary the optical state of the electro-optic material, although in some cases only one of the two electrodes may be a permanent part of the display, with the other electrode being in the form a movable stylus or similar instrument which can be moved over the display to write on the display. When the electro-optic assembly of the present invention is in the form of a complete display with two or more permanent electrodes, each of the first and second substrates will comprise at least one electrode. For example, the assembly may have the form of an active matrix display, with the first substrate comprising a single continuous light-transmissive electrode extending across multiple pixels, and typically the whole, of the display (in practice, the first substrate normally also comprises a polymeric film or similar supporting layer which supports the relatively thin light-transmissive electrode and protects the relatively fragile electrode from mechanical damage), while the second substrate has the form of a backplane comprising a support portion and a plurality of pixel electrodes, which define the individual pixels of the display. Obviously, such a backplane may further comprise non-linear devices (typically thin film transistors) and other circuitry used to produce on the pixel electrodes the potentials needed to drive the display (i.e., to switch the various pixels to the optical states necessary to provide a desired image on the display).

Alternatively, the electro-optic assembly of the present invention may constitute a sub-assembly of such a complete display. In particular, the electro-optic assembly may have the form of a front plane laminate as described in the aforementioned copending application Ser. No. 10/249,957. In such a front plane laminate, one of the substrates (for convenience, say the first substrate) comprises a light-transmissive electrically-conductive layer intended to form the front electrode of a final display (again, the first substrate will normally also comprise a polymeric film or similar supporting layer which supports the relatively thin electrically-conductive layer and protect it from mechanical damage), while the second substrate comprises a release sheet, which is removed before the front plane laminate is laminated to a backplane to form the final display.

Indeed, many of the double release sheets of the present invention can be regarded as special types of electro-optic assemblies of the invention. In practice, such double release sheets typically comprise a layer of electro-optic material having adhesive layers on both sides thereof, both adhesive layers being covered by release sheets. Such a double release sheet comprises an electro-optic assembly of the present invention in which both substrates are release sheets.

The adhesive layer or binder contains one or more additives selected from (a) a salt, a polyelectrolyte, a polymer electrolyte, a solid electrolyte, and combinations thereof; or (b) a conductive metal powder, a ferrofluid, a non-reactive solvent, a conductive organic compound, and combinations thereof.

In certain embodiments, the additive may be a salt such as an inorganic salt, organic salt, or combination thereof. Exemplary salts include potassium acetate, and tetraalkylammonium salts, especially tetrabutylammonium salts such as the chloride. Further examples of salts include lithium salts such as $LiCF_3SOF_3$, $LiClO_4$, $LiPF_6$, $LiBF_4$, $LiAsF_6$, and $LiN(CF_3SO_2)_3$. The presently preferred salt is tetrabutylammonium hexafluorophosphate, largely because of the stability and inertness of this salt.

In other embodiments, the polymer electrolyte is a polyelectrolyte. Polyelectrolytes are typically polymers in which about 10% or more of the molecule is composed of a functional group capable of ionizing to form a charged species. Examples of certain functional groups within a polyelectrolyte include, but are not limited to, carboxylic acids, sulfonic acids, phosphoric acids, and quaternary ammonium compounds. These polymers can be combined with organic or inorganic salts or alternatively used alone. Examples of polyelectrolyes, include but are not limited to, polyacrylic acid, polystyrene sulfonate, poly(2-vinylpyridine), poly(4-vinylpyridine), poly(dimethylammonium chloride, poly(dimethylaminoethyl methacrylate), poly(diethylaminoethyl methacrylate). A preferred polyelectrolyte is the sodium salt of polyacrylic acid.

In a further embodiment of the present invention, the additive is a polymer electrolyte. The term "polymer electrolyte" as used herein describes a polymer that is capable of solubilizing a salt. The solubility of the salt in these polymers can be enhanced by the presence of oxygen and/or nitrogen atoms in the polymer which form ether, carbonyl, carboxylic acids, primary secondary, tertiary, and quaternary amino groups, sulphonic, acids etc. Examples of polymer electrolytes include polyether compounds such as polyethylene oxide, polypropylene oxide, polytetramethyleneoxide, polyamines such as polyethyleinimine, polyvinyl pyrrolidinone, polymers which contain quaternary ammonium groups such as $N^+R1R2R3R4$ wherein R1, R2, R3, and R4 are each independently a H or a straight, branched, or cyclic alkyl group having from 1 to 25 carbon atoms and where the counter ion can be either selected from any organic or inorganic anion.

Still other additives can include a conductive metal powder, a ferro fluid, and/or a non-reactive solvent that may improve or, alternatively, hinder the mobility of the ions in the solution. Examples of suitable non-reactive solvents include water, diethyl ether, dipropyl ether, diethyleneglycol, glyme, diglyme, N-methylpyrrolidone, etc. In still another embodiment, a conductive organic compound can be used as the additive. Some non-limiting examples of these compounds include polyaniline, polythiophene, polypyrrole, poly-3,4-dioxyethylene thiophene, and derivatives of these materials in their n- or p-doped states.

The polymeric adhesive material that is used in the adhesive layer or binder can be any polymeric material that fulfills the particular needs of the end-use application. Examples of suitable polymeric adhesive materials include polyurethane, vinyl acetate, vinyl acetate ethylene, epoxy, a polyacrylic-based adhesive, or combinations thereof. These adhesive materials may be solvent based or aqueous based. An example of a particular polyurethane that can used is described in copending U.S. application Ser. No. 10/715,916 filed 18 Nov. 2003 which is incorporated herein by reference in its entirety and assigned to Air Products and Chemicals, Inc.

The additive incorporated into a polymeric adhesive material may be formed in situ; in other words, one or more precursor materials may be incorporated into the polymeric adhesive material or binder where the precursor material(s) can react with one another, or with the polymeric adhesive or binder, or be changed by exposure of the adhesive material or binder to conditions (for example, exposure to heat, light, or magnetic or electric fields) which cause a change in the precursor materials to form the final additive.

The adhesive material or binder may contain components other than the additive (or other dopant) used to adjust its volume resistivity; for example, the adhesive material or binder may also contain a dye or other colorant. It is known to form full color electro-optic displays by providing a color filter as a separate layer on the viewing surface of the display (the surface through which an observer views the display), this color filter containing pixels of differing colors, for example red, green and blue. However, when a color filter is spaced from the electro-optic material in this manner, there is the possibility of image distortion when the color image is viewed at a substantial angle to the perpendicular to the viewing surface. To avoid such problems, it is in principle desirable to place the color filter immediately adjacent the electro-optic material itself. However, this requires placing the color filter between the electrodes of the display, so that the electrical properties of the color filter will affect the performance of the display. This is a particular problem with a color filter, since such filters are usually formed by dying a polymeric base material with three differing dyes, or mixtures of dyes, to form the red, green and blue or other colored portions, and it is unlikely that the three differing dyes will affect the electrical properties of the color filter in the same manner. The adhesive layer and binders described herein may be used to counteract the effects of the differing dyes and render the electrical properties of the color filter substantially uniform, thereby avoiding artifacts on the image due to non-uniform electrical properties within the color filter.

It is also known (see the aforementioned 2003/0011560) that an "optical biasing element" may be provided in the binder or lamination adhesive of an encapsulated electrophoretic display to adjust the appearance of the display. The provision of such an optical biasing element may affect the electrical properties of the adhesive or binder, and the electrical properties of an adhesive or binder containing such an optical biasing element may be optimized by used of the additives described herein.

The optimum amount of additive will of course vary widely with the exact polymeric binder or adhesive material and the exact additive used, and the desired volume resistivity of the final mixture. However, by way of general guidance it may be indicated that a concentration of from about $10^{-5}$ to about $10^{-4}$ moles of additive per gram of binder or adhesive has been found to give useful results. When the additive is a salt, this range is for 1:1 salts such as tetrabutylammonium chloride, tetrabutylammonium hexafluorophosphate and potassium acetate; if 1:2 salts such as sodium carbonate or calcium chloride are used, lower concentrations, of the order of $10^{-6}$ moles of salt per gram of binder or adhesive may suffice. As shown in the Examples below, the volume resistivity of adhesive materials typically varies in a predictable manner with the concentration of the additive, and hence the final choice of how much additive should be added to achieve a desired volume resistivity may readily be determined empirically.

Although small amounts of salts have been added to polymers used as binders and lamination adhesives in prior art electro-optic displays, for example as biocides to protect the polymers from biological degradation during extended storage, such salts are typically used up during storage as they perform their biocidal or similar function. In contrast, the additives used in the present invention are intended to be permanent constituents of the polymeric binder or lamination adhesive since they are intended to effect a permanent adjustment in the conductivity thereof. Also, the optimum amounts of additives used are typically substantially greater than the amounts of salts used as biocides etc.

Typically, no special procedures are required to incorporate the additive into the adhesive material. If, as is typically the case, the adhesive layer is formed by coating a film of a latex or solution of the adhesive material on to a substrate, or on to the electro-optic material, and drying to form the adhesive layer, the additive will normally simply be dissolved or dispersed in the latex or solution of the adhesive material before coating. The additive may be added to the latex or solution neat or may be dissolved in an aqueous solution, non-aqueous solution, or combination thereof. Similarly if, as is typically the case, an electrophoretic medium is formed by mixing a slurry in capsules in a liquid with a latex or solution of polymeric binder and coating the resultant mixture on to a substrate and drying to form the electrophoretic medium, the additive will normally simply be dissolved or dispersed in the latex or solution of the polymeric binder before this latex or solution is mixed with the capsules. It is of course necessary to ensure that the additive is uniformly dispersed throughout the adhesive material in order to prevent variations in conductivity within the final adhesive or binder layer, but those skilled in coating technology will be familiar with routine techniques, such as lengthy agitation on a roll mill, for ensuring such uniform dispersion.

The choice of the specific additive to be used is governed largely by considerations of compatibility with the other components of the adhesive layer and solubility in the adhesive material to which the additive is to be added. If, as is typically the case, the additive is to be added to an aqueous latex of the adhesive material, the additive should be chosen to have good water solubility, so that among salts alkali metal and substituted ammonium salts are generally preferred. Care should be taken to ensure that the additive does not cause aggregation of the latex particles. Also, the additive should desirably not cause major changes in the pH of the adhesive material, and should not chemically react with the adhesive material or other parts of the final display with which it eventually comes into contact, for example the backplane.

The addition of one or more additives greatly expands the range of polymeric materials, which can be used as binders and lamination adhesives in electro-optic displays. In particular, the addition of one or more additives enables the use of polymeric materials which have mechanical properties highly desirable in electro-optic displays but which have volume resistivities in their pure states too high to be useful. Also, since some electro-optic displays, especially encapsulated electrophoretic displays and electrochromic displays, are sensitive to moisture, the addition of the one or more additive may be used to replace water-based polyurethane dispersions hitherto used in such displays with non-hygroscopic and/or hydrophobic polymeric materials.

It will be appreciated that the modified adhesives and binders disclosed herein may be useful in applications other than electro-optic displays.

A particularly preferred embodiment of the electro-optic assembly of the present invention will now be described, though by way of illustration only, with reference to FIG. 1 of the accompanying drawings, which is a schematic section through one such assembly having the form of a front plane laminate. This electro-optic assembly comprises a substrate, a conductive layer, an electro-optic layer, an adhesive layer, and a second substrate in the form of a release sheet; the assembly is illustrated at an intermediate stage of the manufacturing process for an electro-optic display before the subassembly is laminated to a second assembly, namely a backplane.

Figure 1:
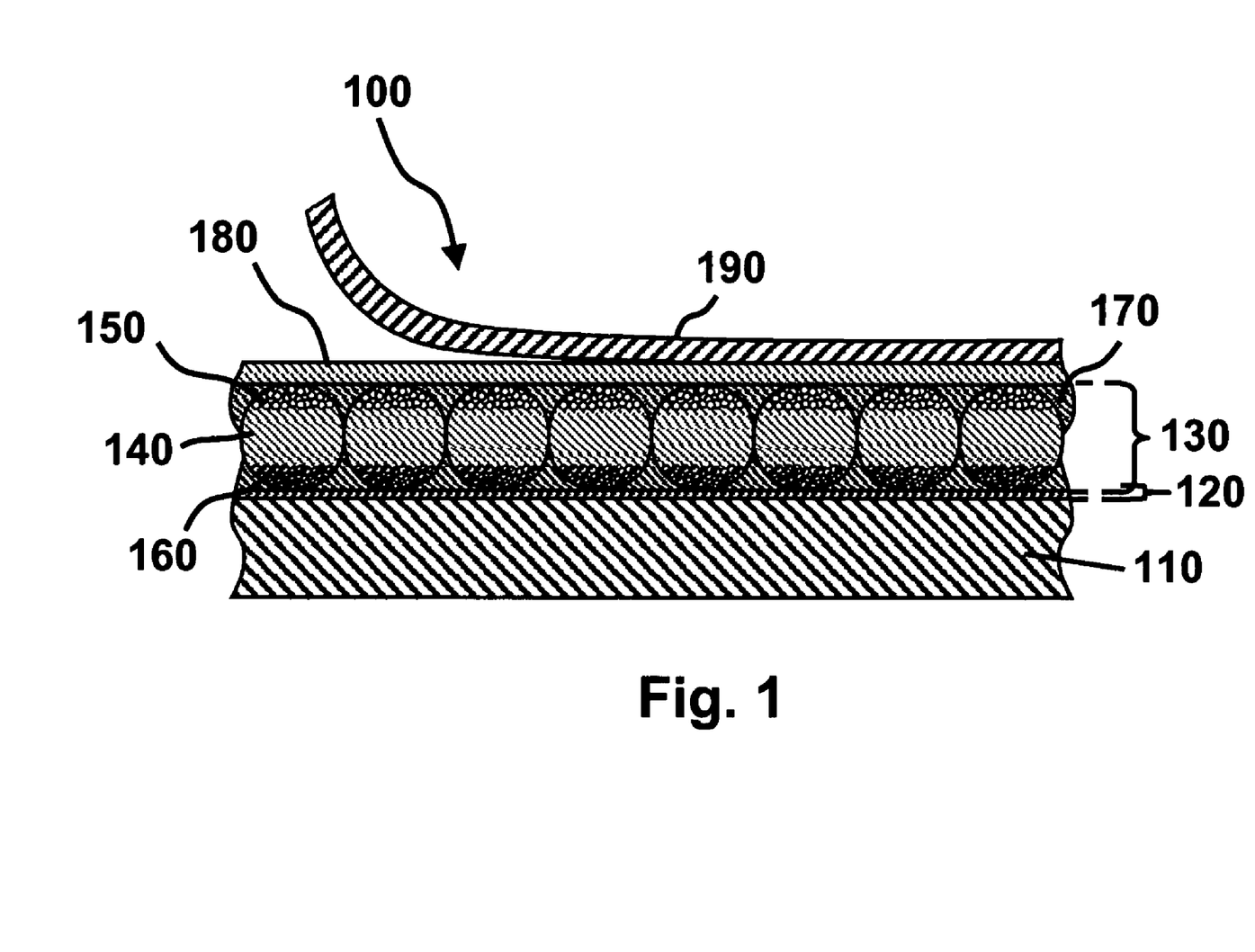
FIG. 1 is a schematic cross-section through an electro-optic assembly of the present invention having the form of a front plane laminate.

The front plane laminate (generally designated 100) shown in FIG. 1 comprises a light-transmissive substrate 110, a light-transmissive electrode layer 120, an electro-optic layer 130, a lamination adhesive layer 180 and a release sheet 190; the release sheet is illustrated in the process of being removed from the lamination adhesive layer 180 preparatory to lamination of the FPL 100 to a backplane.

The substrate 110 is typically a transparent plastic film, such as a 7 mil (177 $\mu$m) polyethylene terephthalate sheet. The lower surface (in FIG. 1) of substrate 110, which forms the viewing surface of the final display, may have one or more additional layers (not shown), for example a protective layer to absorb ultra-violet radiation, barrier layers to prevent ingress of oxygen or moisture into the final display, and anti-reflection coatings to improve the optical properties of the display. Coated onto the upper surface of substrate 110 is the thin light-transmissive electrically conductive layer 120, preferably of ITO, which acts as the common front electrode in the final display. PET films coated with ITO are available commercially.

The electro-optic layer 130 may be deposited on the conductive layer 120, typically by slot coating, the two layers being in electrical contact. The electro-optic layer 130 shown in FIG. 1 is an encapsulated electrophoretic medium and comprises microcapsules 140, each of which comprises negatively charged white particles 150 and positively charged black particles 160 suspended in a hydrocarbon-based suspending fluid 165. The microcapsules 140 are held retained within a polymeric binder 170. Upon application of an electrical field across electro-optic layer 130, white particles 150 move to the positive electrode and black particles 160 move to the negative electrode, so that electro-optic layer 130 appears, to an observer viewing the display through substrate 110, white or black depending on whether conductive layer 120 is positive or negative relative to the adjacent pixel electrode in the backplane.

The FPL 100 is desirably prepared by coating the lamination adhesive 180, in liquid form, conveniently by slot coating, on to release sheet 190, drying (or otherwise curing) the adhesive to form a solid layer, and then laminating the adhesive and release sheet to the electro-optic layer 130, which has previously been coated on to the substrate 110 bearing the conductive layer 120; this lamination may conveniently be effected using hot roll lamination. (Alternatively, but less desirably, the lamination adhesive may be applied over the electro-optic layer 130 and then dried or otherwise cured before being covered with the release sheet 190.) The release sheet 190 is conveniently a 7 mil (177 $\mu$m) film; depending upon the nature of the electro-optic medium used, it may be desirable to coat this film with a release agent, for example a silicone. As illustrated in FIG. 1, the release sheet 190 is peeled or otherwise removed from the lamination adhesive 180 before the FPL 100 is laminated to a backplane (not shown) to form the final display.

An additive, for example tetrabutylammonium hexafluorophosphate, is included in the binder 170 and/or lamination adhesive 180. If the additive is to be included in binder 170, it is conveniently added to the capsule/binder slurry which is coated on to a film comprising the substrate 110 and conductive layer 120, as described in the aforementioned E Ink and MIT patent and applications. Similarly, if the additive is to be included in lamination adhesive 180, it is conveniently added to the liquid form of the lamination adhesive before coating to form the layer 180, as already described.

The following Examples are now given, though by way of illustration only, to show details of preferred materials, conditions and techniques used in the present invention.

EXAMPLE 1

A base adhesive material was prepared by blending NeoRez (Registered Trade Mark) 9630 and NeoRez 9330, two polyurethane dispersions available commercially from Neo-Resins, Inc., 730 Main Street, Wilmington Mass. 01887. This material was divided into eight samples of approximately 50 g each, each sample containing 40 per cent by weight of solids, and varying amounts of potassium acetate, tetrabutylammonium chloride, or poly(acrylic acid) aqueous solution were added as indicated in the Table below; a control sample was also provided with no additives.

TABLE

| Sample No. | Weight of sample (g) | Additive | Mass (g) of additive |
|---|---|---|---|
| 0 | 50.12 | N/A | 0 |
| 1 | 50.00 | Bu$_4$NCl | 0.012 |
| 2 | 50.06 | Bu$_4$NCl | 0.051 |
| 3 | 50.30 | Bu$_4$NCl | 0.099 |
| 4 | 50.10 | KOAc | 0.007 |
| 5 | 49.99 | KOAc | 0.040 |
| 6 | 50.00 | KOAc | 0.082 |
| 7 | 50.00 | PAA, sodium salt (40% wt aq.) | 0.156 |

Each of the samples was mixed for a period of 7 to 10 days to ensure a thoroughly homogeneous product and to re-disperse any gel-like solids, which formed as a result of adding the additive as a solid to the sample. At the end of each mixing period, visual inspection confirmed that all the samples were free from any significant amount of gel.

Figure 2:
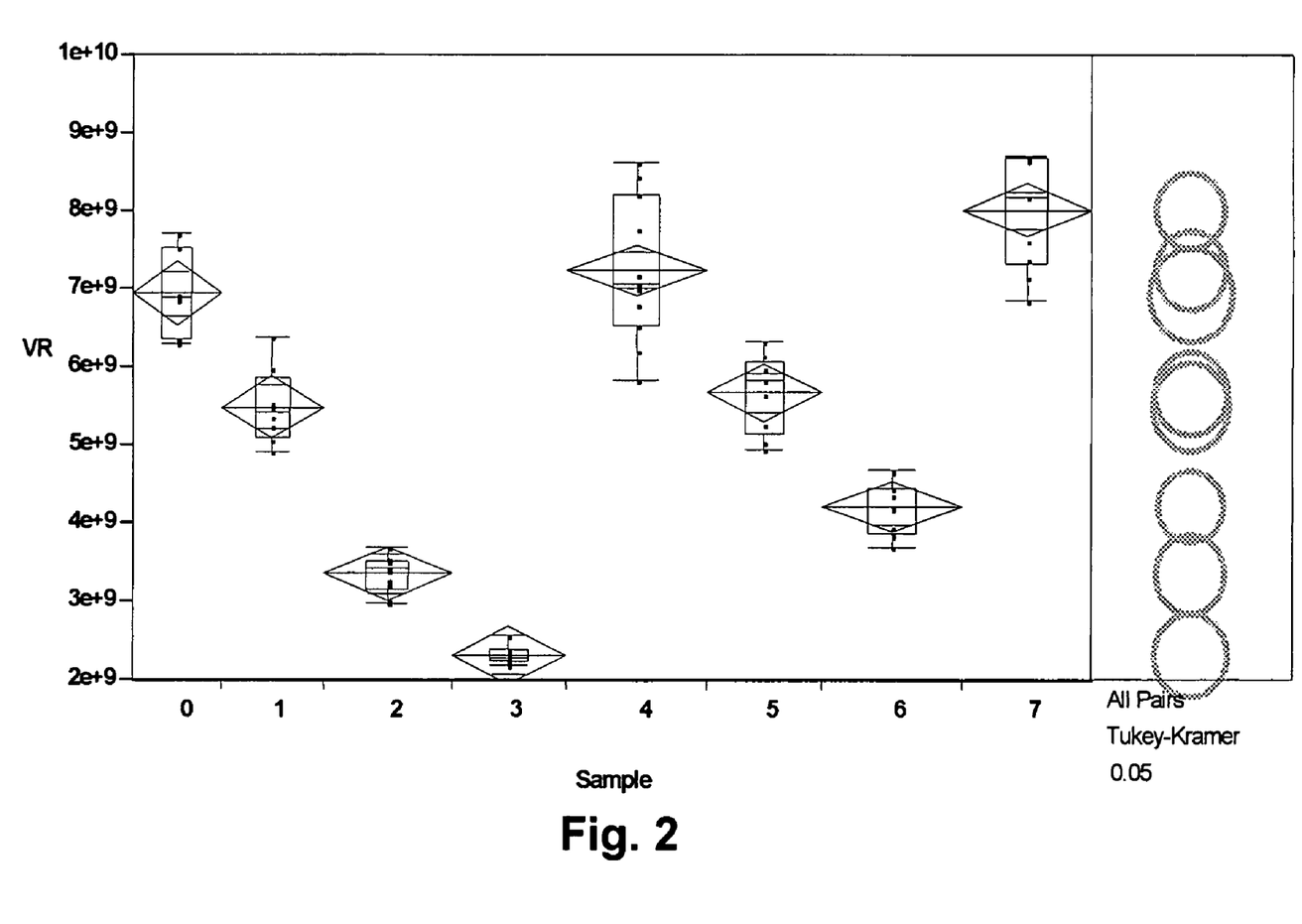
FIG. 2 is a graph showing the volume resistivity of various polymeric adhesive/additive mixtures as determined in the experiments reported in Example 1 below.
Figure 3:
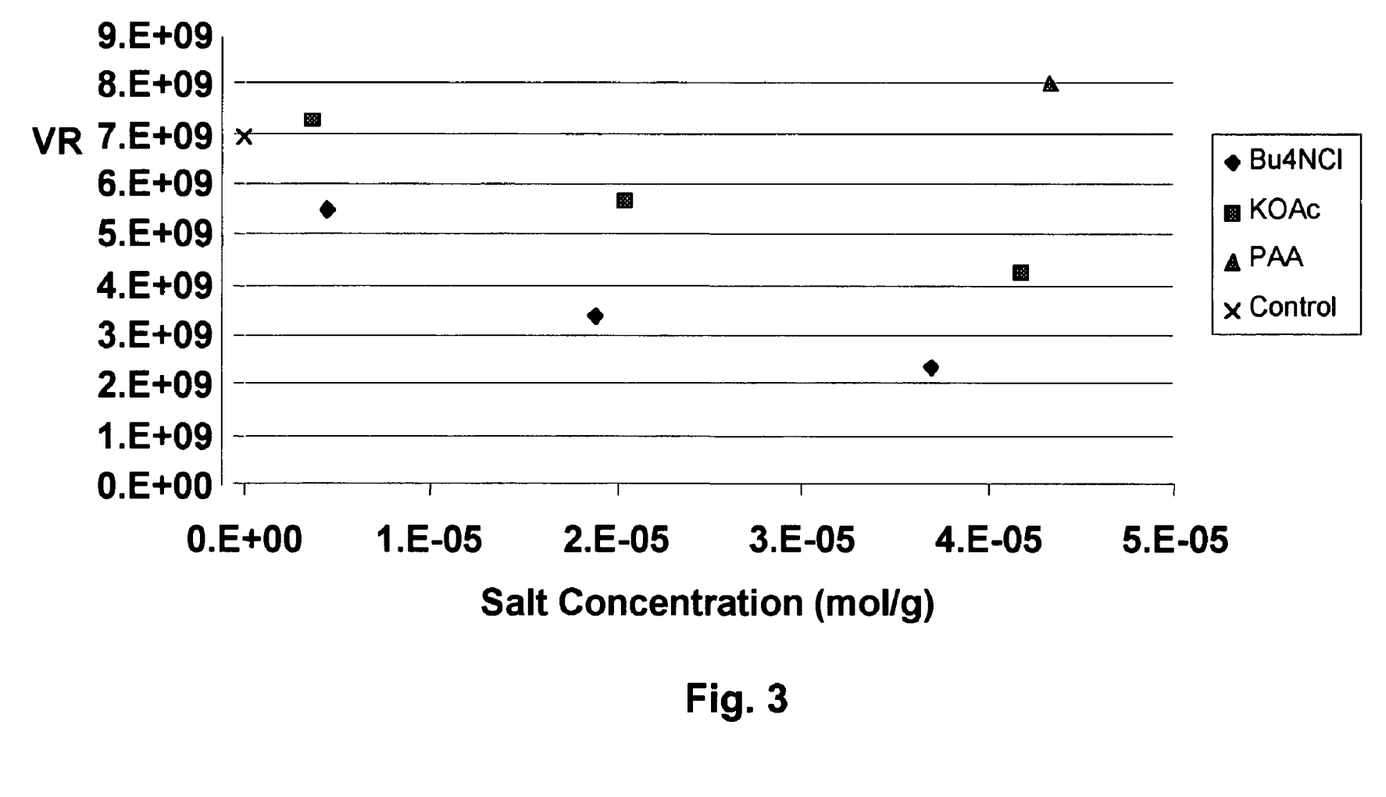
FIG. 3 is a graph plotting the average volume resistivities of the various mixtures shown in FIG. 2 with additive concentration.

Each sample was then coated on to a release sheet and dried to produce a layer of adhesive approximately 40 $\mu$m thick. The dried film was laminated to the conductive surface of a poly(ethylene terephthalate) film provided with an indium tin oxide coating, the release sheet was removed and the exposed surface of the adhesive laminated to an experimental 2 inch by 2 inch (51 by 51 mm) backplane comprising a polymeric film coated with a layer of graphite to produce a single-pixel test unit (essentially a single-pixel display minus the layer of electro-optic medium). The resultant test units were conditioned for 5 days at 25° C. and 30 per cent relative humidity. The thickness of the adhesive was measured and recorded, and the resistance of the adhesive layer was determined. The volume resistivity of the adhesive was then determined from these measurements and the results are shown in FIG. 2 of the accompanying drawings. FIG. 3 shows the average results from FIG. 2 against the additive concentration.

From the results in FIGS. 2 and 3 it will be seen that the additives altered the volume resistivity of the adhesive by about an order of magnitude, and that the variation in volume resistivity was reasonably linear with additive concentration.

EXAMPLE 2

This Example illustrates the effect of tetrabutylammonium hexafluorophosphate (NBu$_4$PF$_6$) in lowering the volume resistivity of an adhesive material as described in the aforementioned copending application Ser. No. 10/715,916.

Stock solutions of NBu$_4$PF$_6$ containing from 10 to 200 mg of the salt per gram of solution were prepared, and added to various aliquots of a polyurethane dispersion to produce the desired levels of the salt ranging from $10^{-7}$ to $10^{-4}$ moles of the salt per gram of adhesive solids (approximately 100 to 100,000 ppm of the salt on a weight/weight adhesive solids basis). The resultant salt solution/dispersion mixtures were mixed on a roller mill for at least three hours to ensure complete mixing.

The salt-containing dispersions thus prepared were coated in the same way as in Example 1 above and dried at 60° C. in air for at least 10 minutes to produce dried adhesive layers having thicknesses from 12 to 20 μm. The resultant adhesive layers were then converted to single pixel test units in the same way as in Example 1 above; at least three test units were used for each salt concentration. Control test units containing the same polyurethane adhesive without any additive were also prepared. The completed test units were conditioned at 30° C. and 30 per cent relative humidity for one week prior to resistivity testing.

Figure 4:
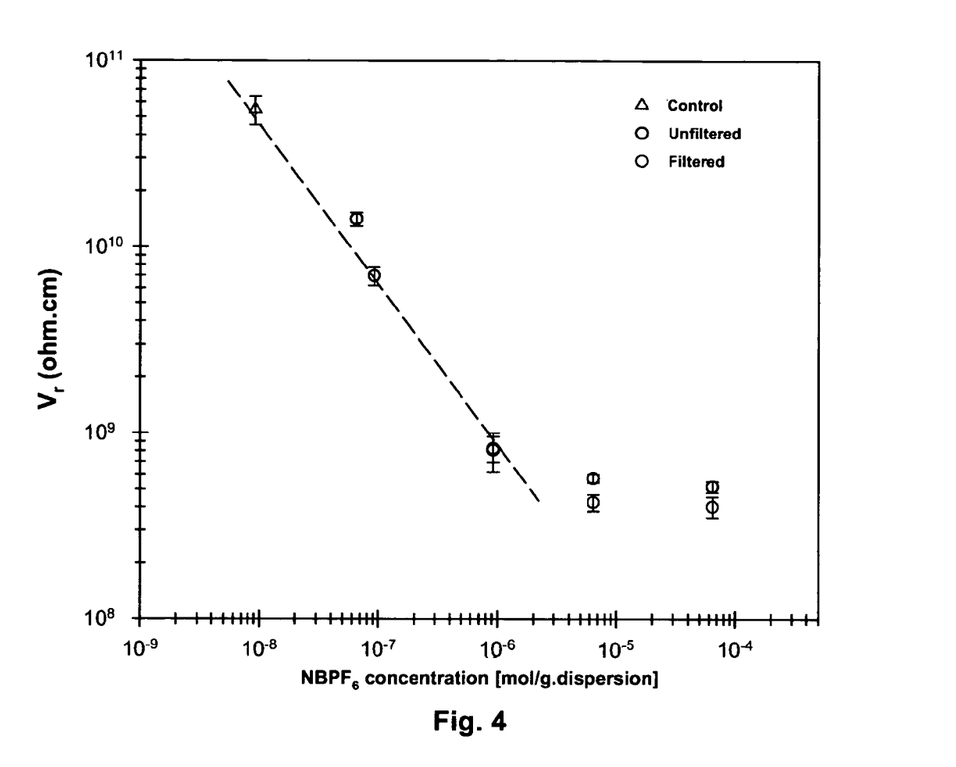
FIG. 4 is a graph similar to FIG. 3 but showing the variation of the volume resistivities of polymeric adhesive/tetrabutylammonium hexafluorophosphate mixtures with salt concentration as determined in the experiments reported in Example 2 below.

The volume resistivity of the test units was then measured using driving pulses of 15V and 300 msec duration, and the resultant data plotted in FIG. 4 of the accompanying drawings. From this Figure it will be seen that the addition of the NBu$_4$PF$_6$ resulted in a substantial decrease in the volume resistivity of the adhesive material, by about two orders of magnitude over the range of salt concentrations tested, and that the volume resistivity varied linearly with salt concentration.

Numerous changes and modifications can be made in the preferred embodiments of the present invention already described without departing from the spirit and skill of the invention. Accordingly, the foregoing description is to be construed in an illustrative and not in a limitative sense.

The invention claimed is:

1. An electro-optic assembly comprising first and second substrates, and an adhesive layer and a layer of electro-optic material disposed between the first and second substrates, the adhesive layer comprising a mixture of a polymeric adhesive material and an additive selected from a salt, a polyelectrolyte, a polymer electrolyte, a solid electrolyte, and combinations thereof, and at least one of the first and second substrates comprises an electrode.

2. An electro-optic assembly according to claim 1 wherein the adhesive layer comprises a mixture of the polymeric adhesive material and a salt.

3. An electro-optic assembly according to claim 2 wherein the salt comprises potassium acetate.

4. An electro-optic assembly comprising first and second substrates, and an adhesive layer and a layer of electro-optic material disposed between the first and second substrates, the adhesive layer comprising a mixture of a polymeric adhesive material and a quaternary ammonium salt.

5. An electro-optic assembly according to claim 4 wherein the salt comprises a tetraalkylammonium salt.

6. An electro-optic assembly according to claim 5 wherein the salt comprises tetrabutylammonium chloride or hexafluorophosphate.

7. An electro-optic assembly comprising first and second substrates, and an adhesive layer and a layer of electro-optic material disposed between the first and second substrates, the adhesive layer comprising a mixture of a polymeric adhesive material and a polyelectrolyte, the polyelectrolyte comprising a salt of a polyacid.

8. An electro-optic assembly according to claim 7 wherein the polyelectrolyte comprises an alkali metal salt of polyacrylic acid.

9. An electro-optic assembly according to claim 1 wherein the adhesive layer comprising the additive is provided with regions of differing colors and serves as a color filter.

10. An electro-optic assembly according to claim 1 wherein the adhesive layer comprising the additive further comprises an optical biasing element.

11. An electro-optic assembly according to claim 2 wherein the adhesive layer comprises from about $10^{-6}$ to about $10^{-4}$ moles of salt per gram of polymeric adhesive material.

12. An electro-optic assembly according to claim 11 wherein the adhesive layer comprises from about $10^{-5}$ to about $10^{-4}$ moles of salt per gram of polymeric adhesive material.

13. An electro-optic assembly according to claim 1 wherein the adhesive layer comprises a polyurethane.

14. An electro-optic assembly according to claim 1 wherein each of the first and second substrates comprises at least one electrode.

15. An electro-optic assembly according to claim 1 wherein the first substrate comprises a light-transmissive electrically-conductive electrode, the second substrate comprises a release sheet, and the electro-optic medium is a solid electro-optic medium.

16. An article of manufacture comprising:
   a layer of a solid electro-optic medium having first and second surfaces on opposed sides thereof;
   a first adhesive layer on the first surface of the layer of solid electro-optic medium;
   a release sheet disposed on the opposed side of the first adhesive layer from the layer of solid electro-optic medium; and
   a second adhesive layer on the second surface of the layer of solid electro-optic medium,
   at least one of the first and second adhesive layers comprising a mixture of a polymeric adhesive material and an additive selected from a salt, a polyelectrolyte, a polymer electrolyte, a solid electrolyte, and combinations thereof.

17. An electro-optic assembly comprising first and second substrates, and an adhesive layer and a layer of electro-optic material disposed between the first and second substrates, the adhesive layer comprising a mixture of a polymeric adhesive material and an additive selected from a conductive metal powder, a ferrofluid, a non-reactive solvent, a conductive organic compound, and combinations thereof, and at least one of the first and second substrates comprises an electrode.

18. An electro-optic assembly according to claim 17 wherein the conductive metal powder comprises nickel.

19. An article of manufacture comprising:
   a layer of a solid electro-optic medium having first and second surfaces on opposed sides thereof;
   a first adhesive layer on the first surface of the layer of solid electro-optic medium;
   a release sheet disposed on the opposed side of the first adhesive layer from the layer of solid electro-optic medium; and
   a second adhesive layer on the second surface of the layer of solid electro-optic medium, at least one of the first and second adhesive layers comprising a mixture of a polymeric adhesive material and an additive selected from a conductive metal powder, a ferrofluid, a non-reactive solvent, a conductive organic compound, and combinations thereof.

20. An electrophoretic medium comprising a plurality of capsules, each of the capsules comprising a capsule wall, a suspending fluid encapsulated within the capsule wall and a plurality of electrically charged particles suspended in the suspending fluid and capable of moving therethrough on application of an electric field to the medium, the medium further comprising a binder surrounding the capsules, the binder comprising a mixture of a polymeric adhesive material and an additive selected from a salt, a polyelectrolyte, a polymer electrolyte, a solid electrolyte and combinations thereof.

21. An electrophoretic medium according to claim 20 wherein the binder comprises a mixture of the polymeric adhesive material and a salt.

22. An electrophoretic medium according to claim 21 wherein the salt comprises potassium acetate.

23. An electrophoretic medium according to claim 21 wherein the salt comprises a quaternary ammonium salt.

24. An electrophoretic medium according to claim 23 wherein the salt comprises a tetraalkylammonium salt.

25. An electrophoretic medium according to claim 24 wherein the salt comprises tetrabutylammonium chloride or hexafluorophosphate.

26. An electrophoretic medium according to claim 20 wherein the polyelectrolyte comprises a salt of a polyacid.

27. An electrophoretic medium according to claim 26 wherein the polyelectrolyte comprises an alkali metal salt of polyacrylic acid.

28. An electrophoretic medium according to claim 20 wherein the binder comprising the additive further comprises an optical biasing element.

29. An electrophoretic medium according to claim 20 comprising from about $10^{-6}$ to about $10^{-4}$ moles of salt per gram of binder.

30. An electrophoretic medium according to claim 29 comprising from about $10^{-5}$ to about $10^{-4}$ moles of salt per gram of binder.

31. An electrophoretic medium according to claim 20 wherein the binder comprises a polyurethane.

32. An electrophoretic medium comprising a plurality of capsules, each of the capsules comprising a capsule wall, a suspending fluid encapsulated within the capsule wall and a plurality of electrically charged particles suspended in the suspending fluid and capable of moving therethrough on application of an electric field to the medium, the medium further comprising a binder surrounding the capsules, the binder comprising a mixture of a polymeric adhesive material and an additive selected from a conductive metal powder, a ferrofluid, a non-reactive solvent, a conductive organic compound, and combinations thereof.

33. An electro-optic assembly comprising first and second substrates and an adhesive layer and a layer of an electrophoretic medium disposed between the first and second substrates, the electrophoretic medium comprising a suspending fluid and a plurality of electrically charged particles suspended in the suspending fluid and capable of moving therethrough upon application of an electric field to the medium, the adhesive layer comprising a mixture of a polymeric adhesive material and an additive selected from a salt, a polyelectrolyte, a polymer electrolyte, a solid electrolyte, and combinations thereof.

34. An electro-optic assembly according to claim 33 wherein the particles and the suspending fluid are confined within a plurality of capsules.

35. An electro-optic assembly according to claim 33 wherein the particles and the suspending fluid are present as a plurality of discrete droplets, the electrophoretic medium further comprising a continuous phase of polymeric binder surrounding the droplets.

36. An electro-optic assembly according to claim 33 wherein the particles and the suspending fluid are retained within a plurality of cavities formed in a carrier medium.

37. An electro-optic assembly according to claim 33 wherein the adhesive layer comprises a mixture of the polymeric adhesive material and a salt.

38. An electro-optic assembly according to claim 37 wherein the salt comprises potassium acetate.

39. An electro-optic assembly according to claim 37 wherein the salt comprises a quaternary ammonium salt.

40. An electro-optic assembly according to claim 39 wherein the salt comprises a tetraalkylammonium salt.

41. An electro-optic assembly according to claim 40 wherein the salt comprises tetrabutylammonium chloride or hexafluorophosphate.

42. An electro-optic assembly according to claim 33 wherein the polyelectrolyte comprises a salt of a polyacid.

43. An electro-optic assembly according to claim 42 wherein the polyelectrolyte comprises an alkali metal salt of polyacrylic acid.

44. An electro-optic assembly according to claim 33 wherein the adhesive layer comprising the additive is provided with regions of differing colors and serves as a color filter.

45. An electro-optic assembly according to claim 33 wherein the adhesive layer comprising the additive further comprises an optical biasing element.

46. An electro-optic assembly according to claim 37 wherein the adhesive layer comprises from about $10^{-6}$ to about $10^{-4}$ moles of salt per gram of polymeric adhesive material.

47. An electro-optic assembly according to claim 46 wherein the adhesive layer comprises from about $10^{-5}$ to about $10^{-4}$ moles of salt per gram of polymeric adhesive material.

48. An electro-optic assembly according to claim 33 wherein the adhesive layer comprises a polyurethane.

49. An electro-optic assembly comprising first and second substrates, and an adhesive layer and a layer of an electrophoretic medium disposed between the first and second substrates, the electrophoretic medium comprising a suspending fluid and a plurality of electrically charged particles suspended in the suspending fluid and capable of moving therethrough upon application of an electric field to the medium, the adhesive layer comprising a mixture of a polymeric adhesive material and an additive selected from a conductive metal powder, a ferrofluid, a non-reactive solvent, a conductive organic compound, and combinations thereof.

50. An electro-optic assembly comprising first and second substrates, and an adhesive layer and a layer of a rotating bichromal member electro-optic material disposed between the first and second substrates, the adhesive layer comprising a mixture of a polymeric adhesive material and an additive selected from a salt, a polyelectrolyte, a polymer electrolyte, a solid electrolyte, and combinations thereof.

51. An electro-optic assembly comprising first and second substrates, and an adhesive layer and a layer of a rotating bichromal member electro-optic material disposed between the first and second substrates, the adhesive layer comprising a mixture of a polymeric adhesive material and an additive selected from a conductive metal powder, a ferrofluid, a non-reactive solvent, a conductive organic compound, and combinations thereof.

* * * * *